US010647289B2

(12) United States Patent
McNabb et al.

(10) Patent No.: US 10,647,289 B2
(45) Date of Patent: May 12, 2020

(54) VEHICLE DRIVER LOCATOR

(71) Applicant: Ford Global Technologies, LLC, Dearborn, MI (US)

(72) Inventors: David McNabb, Ann Arbor, MI (US); Vivekanandh Elangovan, Canton, MI (US); Erick Michael Lavoie, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 15/352,540

(22) Filed: Nov. 15, 2016

(65) Prior Publication Data
US 2018/0137381 A1 May 17, 2018

(51) Int. Cl.
*B60R 25/01* (2013.01)
*G06T 7/70* (2017.01)
(Continued)

(52) U.S. Cl.
CPC ............ *B60R 25/01* (2013.01); *B60Q 1/0023* (2013.01); *B60Q 1/2607* (2013.01); *B60Q 1/323* (2013.01); *B60Q 1/50* (2013.01); *B60R 25/245* (2013.01); *G06K 9/00791* (2013.01); *G06T 7/70* (2017.01); *H04W 4/48* (2018.02); *H04W 76/11* (2018.02); *B60Q 2400/40* (2013.01); *B60Q 2900/30* (2013.01); *H04W 4/80* (2018.02); *H04W 76/14* (2018.02)

(58) Field of Classification Search
CPC ...... G07C 2209/63; G07C 2009/00984; B60Q 2400/40; B60Q 1/24; B60Q 1/32; B60Q 1/323; B60Q 3/217; B60Q 3/267; B60Q 3/80; B60R 2325/205; B60R 25/245
USPC .................... 348/148; 340/5.16, 426.16, 5.72
See application file for complete search history.

(56) References Cited

U.S. PATENT DOCUMENTS 6,552,649 B1 4/2003 Okada et al.
7,227,474 B2 6/2007 Zoratti et al.
(Continued)

FOREIGN PATENT DOCUMENTS

DE 102010051205 A1 5/2012
EP 2384936 A1 11/2011
(Continued)

OTHER PUBLICATIONS

Search Report dated Apr. 19, 2018 for GB Patent Application No. GB 1718573.7 (3 pages).
(Continued)

*Primary Examiner* — Nathnael Aynalem
(74) *Attorney, Agent, or Firm* — Frank Lollo; Eversheds Sutherland (US) LLP

(57) ABSTRACT

A vehicle may include: a motor, nodes, sensors, puddle lights, and processor(s) configured to: command the nodes to produce high power signal patterns to link with a mobile device; command at least some of the nodes to produce low power signal patterns to link with the mobile device based detecting the high power link; activate at least some of the puddle lights based on the low power link. The vehicle may activate at least some of the puddle lights based on the low power link by running processing software on measurements captured by the nodes based on the low power link.

19 Claims, 7 Drawing Sheets

(51) Int. Cl.

| | | |
|---|---|---|
| *H04W 76/11* | (2018.01) | |
| *B60Q 1/00* | (2006.01) | |
| *B60Q 1/26* | (2006.01) | |
| *B60Q 1/50* | (2006.01) | |
| *G06K 9/00* | (2006.01) | |
| *B60R 25/24* | (2013.01) | |
| *H04W 4/48* | (2018.01) | |
| *B60Q 1/32* | (2006.01) | |
| *H04W 76/14* | (2018.01) | |
| *H04W 4/80* | (2018.01) | |

(56) References Cited

U.S. PATENT DOCUMENTS

| | | | |
|---|---|---|---|
| 7,609,149 B2 | 10/2009 | Li | |
| 8,077,011 B2 | 12/2011 | McBride et al. | |
| 9,008,917 B2 | 4/2015 | Gautama et al. | |
| 9,126,525 B2 | 9/2015 | Lynam | |
| 9,156,496 B2 | 10/2015 | Greenwood | |
| 9,607,460 B2 * | 3/2017 | Yamane | G07C 9/00309 |
| 9,858,817 B1 | 1/2018 | Bletzer et al. | |
| 9,884,590 B2 | 2/2018 | Park | |
| 9,963,107 B2 * | 5/2018 | Murar | B60R 25/24 |
| 2004/0104815 A1 | 6/2004 | Suyama | |
| 2006/0046684 A1 | 3/2006 | Kameyama | |
| 2007/0030136 A1 | 2/2007 | Teshima | |
| 2007/0040649 A1 * | 2/2007 | Dulgerian | B60R 25/24 340/5.64 |
| 2007/0109093 A1 * | 5/2007 | Matsubara | G07C 9/00309 340/5.61 |
| 2007/0165967 A1 * | 7/2007 | Ando | G01S 17/023 382/291 |
| 2007/0200672 A1 * | 8/2007 | McBride | B60R 25/245 340/5.72 |
| 2008/0012940 A1 | 1/2008 | Kanaoka | |
| 2009/0243796 A1 * | 10/2009 | Tieman | B60R 25/24 340/5.72 |
| 2010/0191392 A1 * | 7/2010 | Juzswik | B60R 25/245 701/2 |
| 2012/0056734 A1 | 3/2012 | Ikeda et al. | |
| 2013/0083061 A1 | 4/2013 | Mishra | |
| 2013/0090783 A1 * | 4/2013 | Katou | B60R 25/24 701/2 |
| 2013/0311001 A1 * | 11/2013 | Hampiholi | B60R 25/25 701/1 |
| 2013/0332004 A1 | 12/2013 | Gompert | |
| 2014/0253287 A1 * | 9/2014 | Bauman | G07C 9/00309 340/5.61 |
| 2014/0253288 A1 * | 9/2014 | O'Brien | G07C 9/00309 340/5.61 |
| 2014/0277935 A1 | 9/2014 | Daman et al. | |
| 2015/0009010 A1 | 1/2015 | Biemer | |
| 2015/0070135 A1 * | 3/2015 | Ford | B60R 25/24 340/5.72 |
| 2015/0109444 A1 | 4/2015 | Zhang | |
| 2015/0120151 A1 * | 4/2015 | Akay | B60R 25/24 701/49 |
| 2015/0161834 A1 | 6/2015 | Spahl et al. | |
| 2015/0191152 A1 * | 7/2015 | Gennermann | B60R 25/20 180/287 |
| 2015/0325066 A1 | 11/2015 | Muller | |
| 2016/0066254 A1 | 3/2016 | Colby et al. | |
| 2016/0090039 A1 | 3/2016 | Tan | |
| 2016/0096466 A1 | 4/2016 | Okumura | |
| 2016/0096476 A1 | 4/2016 | Fairchild | |
| 2016/0127693 A1 | 5/2016 | Chung | |
| 2016/0217638 A1 | 7/2016 | Child | |
| 2016/0332574 A1 | 11/2016 | Park | |
| 2017/0237945 A1 * | 8/2017 | Murar | H04N 7/183 348/148 |
| 2017/0293809 A1 | 10/2017 | Thompson | |
| 2018/0012082 A1 | 1/2018 | Satazoda | |
| 2018/0029538 A1 * | 2/2018 | Matsushita | B60R 16/023 |
| 2018/0053416 A1 * | 2/2018 | Sanji | B60R 25/24 |
| 2018/0204072 A1 | 7/2018 | Al Rasheed | |
| 2018/0290627 A1 * | 10/2018 | Hariri | B60R 25/245 |

FOREIGN PATENT DOCUMENTS

| | | |
|---|---|---|
| EP | 2637897 B1 | 10/2016 |
| GB | 2463544 A | 3/2010 |
| GB | 2554797 A | 4/2018 |

OTHER PUBLICATIONS

Smart Enhanced Back-Up Camera (SMARTEBC) for CV220X Image Cognition Processors, Tina Jeffrey.

The Car With Infrared Headlights: Ford Develops Smart Lights to Detect Pedestrians, Cyclists and Animals at Night, Richard Gray, Jul. 21, 2015.

Search Report dated Nov. 14, 2018 for GB Patent Application No. GB 1809116.5 (4 pages).

* cited by examiner

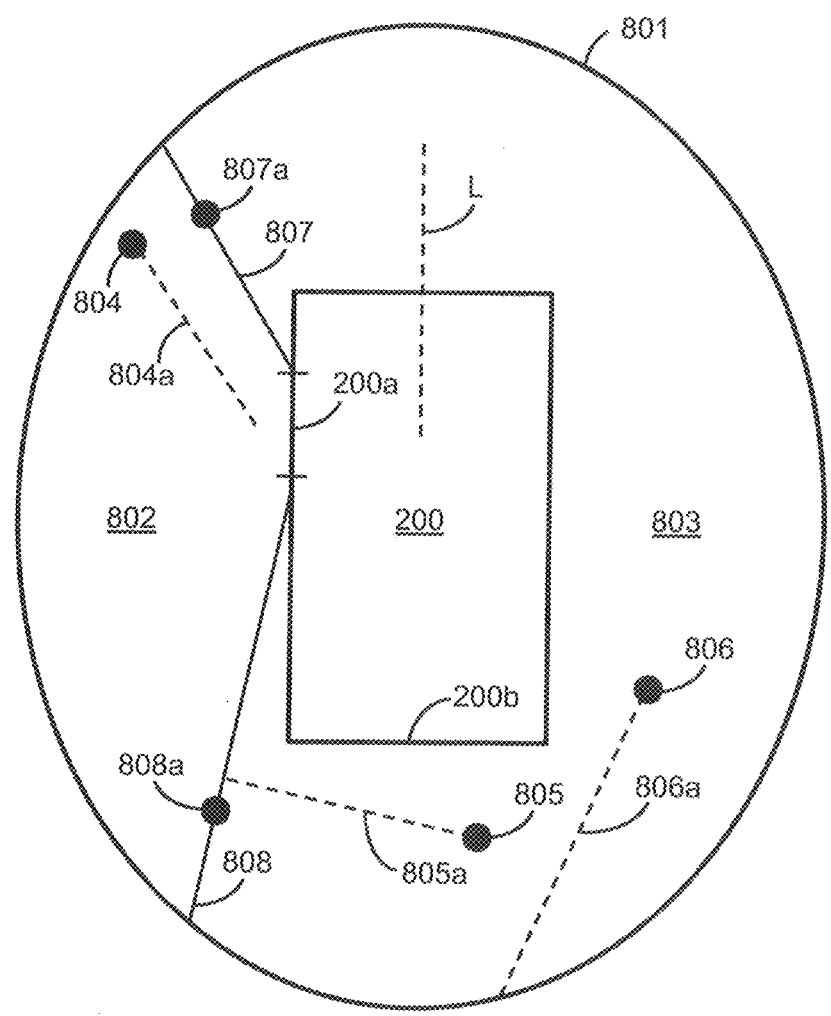

VEHICLE DRIVER LOCATOR

TECHNICAL FIELD

The present disclosure generally relates to automated detection of a driver approaching a vehicle.

BACKGROUND

Some newer vehicles are configured to enter a welcome mode upon detecting an approaching driver. In response, the vehicles typically perform one or more welcome mode functions (e.g., activating puddle lights, unlocking doors, etc.). The vehicles typically detect an approaching driver by receiving a wireless transmission, at a single location, from a key fob. Such a technique, however, does not enable the vehicle to accurately determine a location, velocity, or acceleration of the driver with respect to the vehicle. Thus, the vehicle may incorrectly activate welcome mode when the driver is passing near the vehicle, but not walking toward the vehicle. As a result, the vehicle may waste energy and inappropriately unlock.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

A vehicle may include: a motor, nodes, sensors, puddle lights, and processor(s) configured to: command the nodes to produce high power signal patterns to link with a mobile device; command at least some of the nodes to produce low power signal patterns to link with the mobile device based detecting the high power link; activate at least some of the puddle lights based on the low power link. The vehicle may activate at least some of the puddle lights based on the low power link by running processing software on measurements captured by the nodes based on the low power link.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 7 is a schematic of areas corresponding to a driver door operation.

DETAILED DESCRIPTION OF EXAMPLE EMBODIMENTS

Disclaimer

Figure 1:
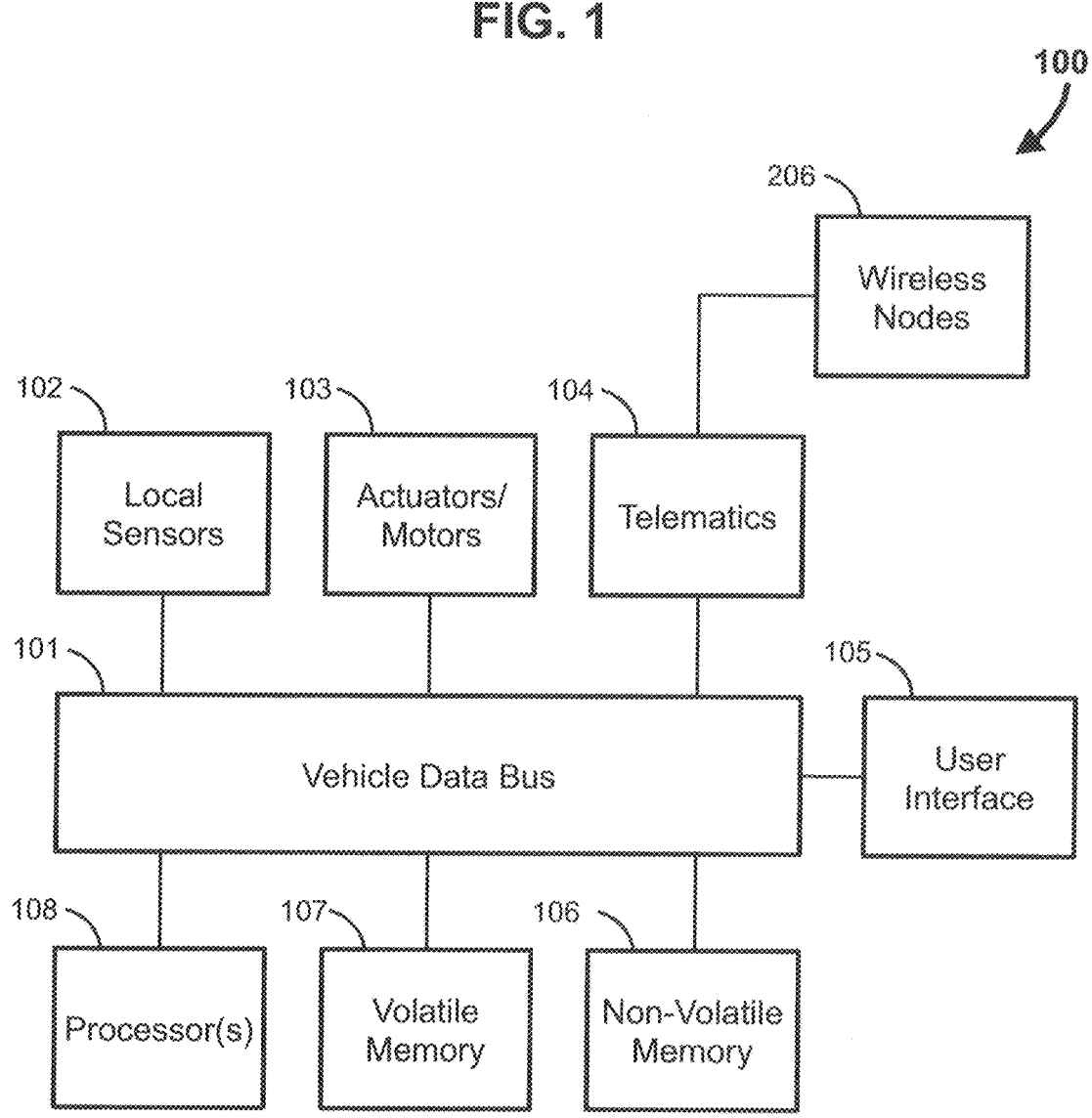
FIG. 1 is a block diagram of a computing system of a vehicle.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as on e option, and mutually exclusive alternatives as another option. In other words, the conjunction "or" should be understood to include "and/or" as one option and "either/or" as another option.

Overview of the Computing System

FIG. 1 shows an example computing system 100 of an example vehicle 200. The computing system 100 enables automatic control of mechanical systems within the vehicle 200. The computing system 100 enables wired or wireless communication with external devices, such as mobile phones, servers, sensors, tablets, smart watches, etc. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via BLUETOOTH Low Energy (BLE), WiFi, other RF communication methods, cellular data (e.g., 3G, LTE), USB, etc. The telematics unit 104 may include wireless nodes 206.

The actuators/motors 103 produce tangible results. Examples of actuators/motors include fuel injectors, windshield wipers, brake light circuits, transmissions, airbags, engines, power train motors, lights, door locks, steering, etc. The local sensors 102 transmit digital readings or measurements to the processor 108. Examples of suitable sensors include temperature sensors, rotation sensors, seatbelt sensors, speed sensors, cameras, lidar sensors, radar sensors, infrared sensors, ultrasonic sensors etc. It should be appreciated that the various connected components of FIG. 1 may include separate or dedicated processors and memory.

Mobile device 124 may include some or all of the features described with reference to FIG. 1. For example, mobile device 124 may include a telematics unit, memory, and one or more processors. Mobile device 124 may be a smartphone, a tablet, a key fob, etc equipped with BLE, WiFi, or other RF communication methods.

Overview of the Vehicle

The vehicle 200 is also referred to as a first vehicle 200. The first vehicle 200 may be autonomous. The vehicle 200 includes a motor, a battery, at least one wheel driven by the motor, and a steering system configured to turn the at least one wheel about an axis.

Some vehicles are described, for example, in U.S. patent application Ser. No. 14/991,496 to Miller, U.S. Pat. No. 8,180,547 to Prasad, U.S. patent application Ser. No. 15/186,850 to Lavoie, U.S. patent application Ser. No. 14/972,761 to Hu, and U.S. Publication No. 2015/0161834 to Spahl, all of which are hereby incorporated by reference in their entireties. Vehicle 200 may share some or all of the features disclosed in any or all of Miller, Lavoie, Hu, and Spahl.

The vehicle may include a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels.

The vehicle may include a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels.

The vehicle 200 is configured to perform the methods and operations described herein. In some cases, the vehicle 200 is configured to perform these functions via computer programs stored on the volatile and/or non-volatile memories of the computing system 100. One or more processors are "configured to" perform a disclosed operation when at least one of the one or more processors is in operative communication with memory storing a software program with code or instructions embodying the disclosed operation. Further description of how the processor, memories, and programs cooperate appears in Prasad.

Initiation Application and Welcome Mode

The vehicle 200, by way of the computing system 100 is configured to execute both an initiation application and a welcome mode. When the initiation application yields a certain output (as discussed below), the vehicle 200 enters welcome mode.

As partially disclosed in Spahl, the welcome mode may include the activation of vehicle interior and exterior lighting including puddle lights, front and rear running lamps, cabin courtesy lights, and the playing of a sound such as a horn chirp. The welcome mode may include adjustment of various personalization features in the vehicle such as the automatic placement of power seats so that the vehicle is ready and completely personalized for the approaching user upon entry to the vehicle. The welcome mode may include unlocking one or more vehicle doors.

Cameras and Ultrasonic Sensors

Figure 2:
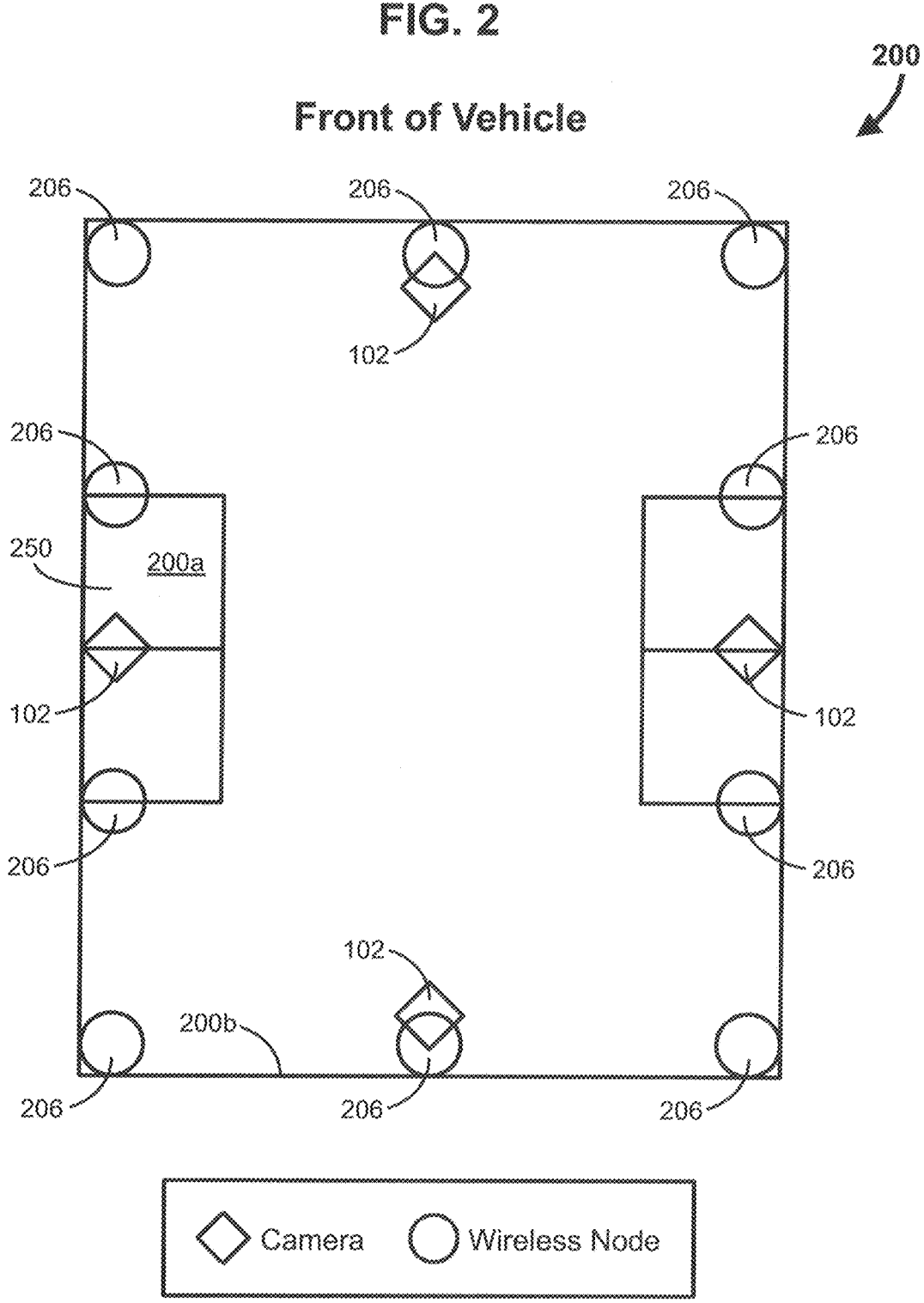
FIG. 2 is a schematic of the vehicle including cameras.
Figure 3:
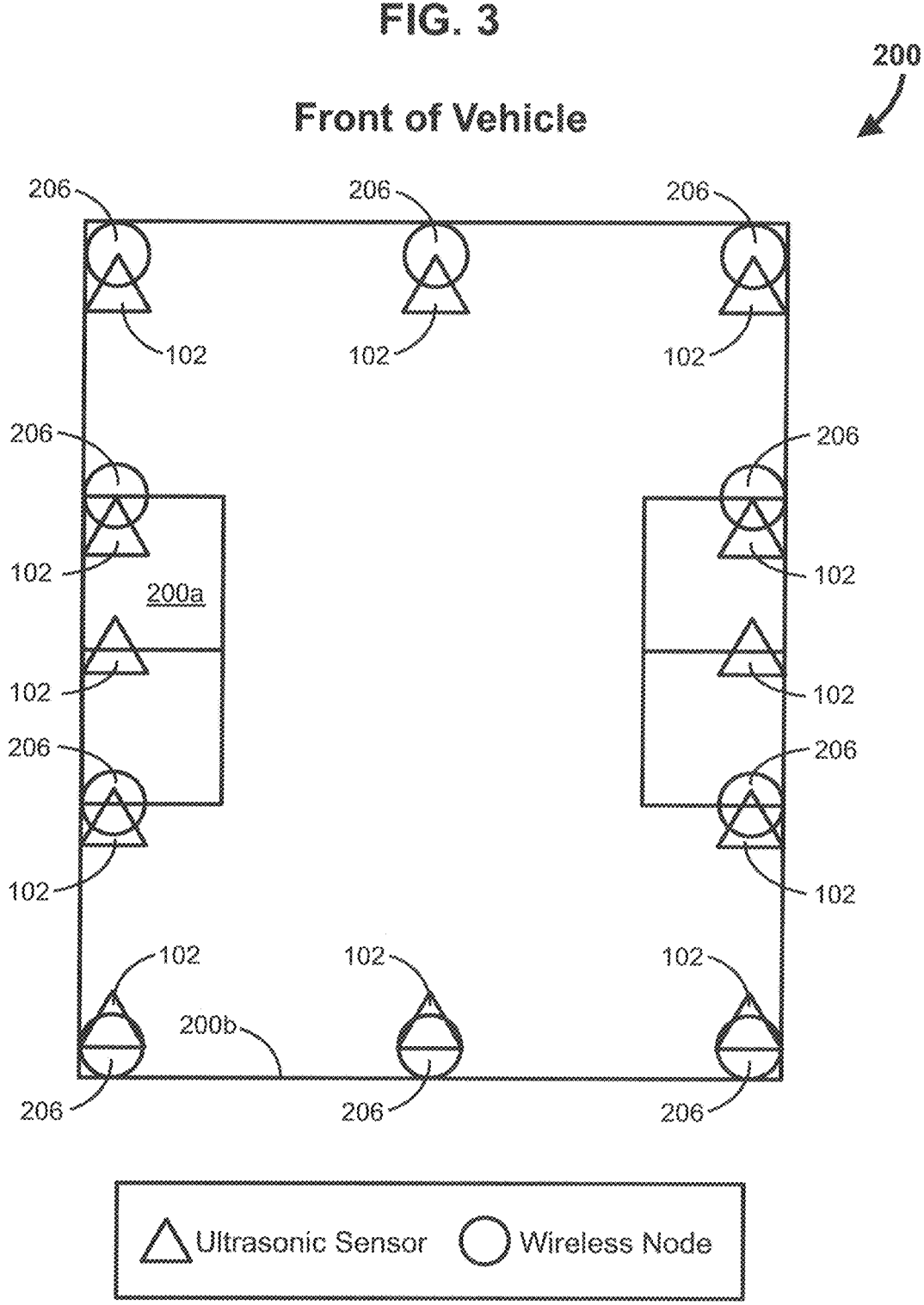
FIG. 3 is a schematic of the vehicle further including ultrasonic sensors.

As stated above, local sensors 102 include cameras and/or ultrasonic sensors. Telematics 104 includes wireless nodes 206. FIG. 2 shows cameras and wireless nodes 206 positioned about the vehicle 200. FIG. 3 shows ultrasonic sensors and wireless nodes 206 positioned about the vehicle 200. It should be appreciated that the present vehicle may include the features of both FIGS. 2 and 3 (i.e., the wireless nodes, the ultrasonic sensors, and the cameras), the features of FIG. 2 and not FIG. 3, or the features of FIG. 3 and not FIG. 2.

The cameras capture images. The vehicle 200 is configured to perform analysis on these images with known image processing software. For example, the vehicle 200 may perform facial recognition or other biometric analysis (e.g., height analysis, body mass analysis, iris analysis, gait analysis, etc.) to determine an identity of a person 126 captured in one of the images. Additionally, the vehicle may determine a trajectory of an object, such as the person, (including position, velocity, and/or acceleration) with reference to one or more captured images.

The ultrasonic sensors transmit and receive ultrasonic waves. By applying known ultrasonic mapping software to measurements of the received waves, the vehicle 200 determines the trajectory (including position, velocity, and/or acceleration) of detected objects.

Wireless Nodes and Signal Patterns

As shown in FIGS. 2 and 3, the wireless nodes 206 are spaced around the perimeter of the vehicle 200. Each wireless node 206 is configured as an antenna module. More specifically, each antenna module may include a plurality of sector antennas, such as, for example, three sector antennas.

Figure 4:
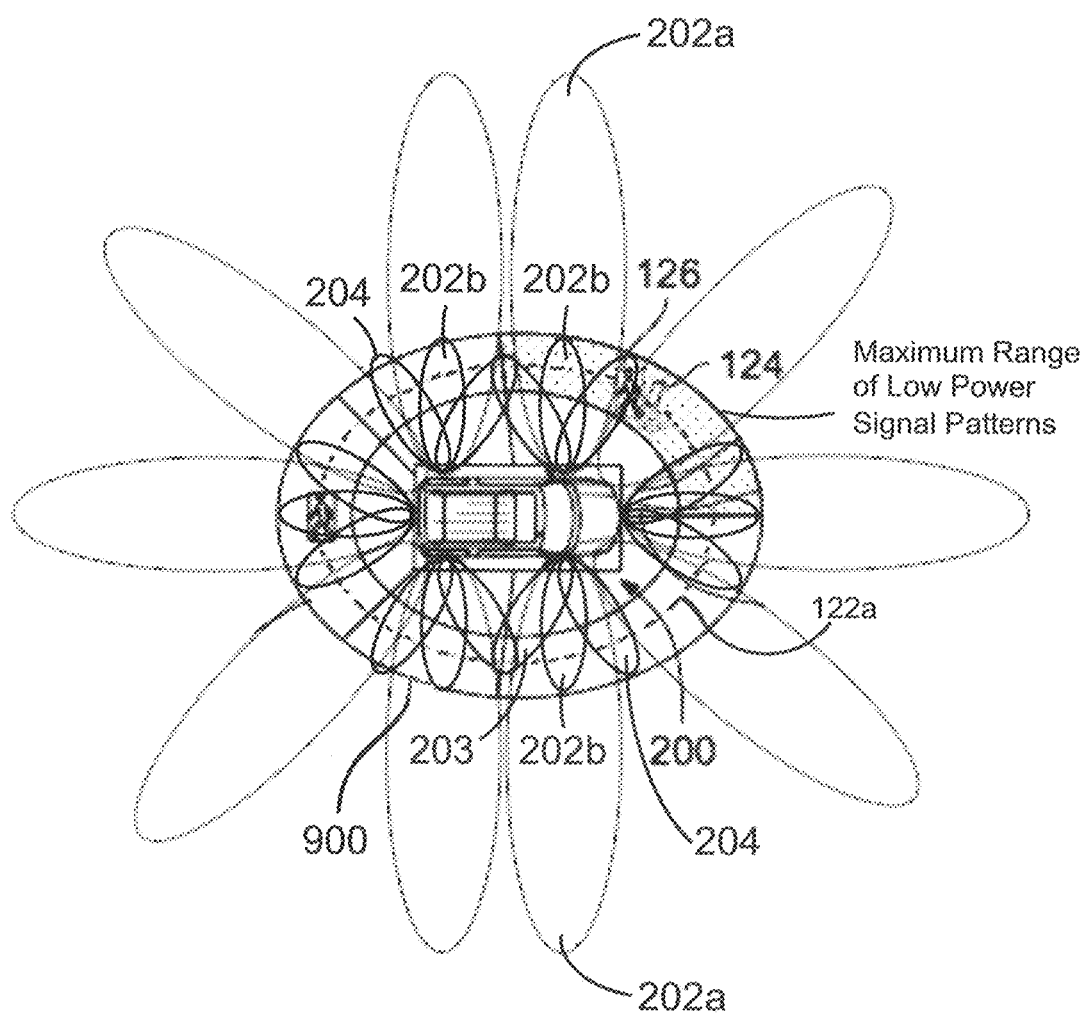
FIG. 4 is a schematic of signal patterns produced by nodes of the vehicle.

With reference to FIG. 4, a first or middle sector antenna is configured to emit a first high power signal pattern 202a and a first low power signal pattern 202b. A second or right sector antenna is configured to emit a second low power signal pattern 203 to the right of the first low power signal pattern 202b. (for the purposes of this disclosure, right and left are taken from the perspective of the vehicle 200). A third or left sector antenna is configured to emit a third low power signal pattern 204 to the left of the first low power signal pattern 202b.

According to some embodiments, the low power signal patterns blanket the entire area in between vehicle 200 and welcome mode threshold 122a. According to some embodiments, the low power signal patterns blanket the entire area between vehicle 200 and perimeter 900. According to some embodiments, the perimeter 900 represents a maximum range of some or all of the low power signal patterns.

Initiation Application and Welcome Mode

As stated above, the vehicle 200 is configured to run an initiation application. The vehicle 200 may enter the initiation application, at block 402, when the prime mover (primary engine or motor) is off, the vehicle 200 has been placed in park, and/or the driver has left a vicinity of the vehicle (i.e., the conditions of block 400 have been satisfied).

The vehicle 200 may detect when the driver has left the vicinity of the vehicle 200 with reference to a mobile device 124 associated with the driver. More specifically, the vehicle 200 stores a list of one or more mobile devices 124 paired with each driver (and properties of those drivers, as discussed below). The vehicle determines an identity of the driver with reference to facial recognition of the driver or a unique code of a key fob used to start the vehicle. When the vehicle is off and placed in park, the wireless nodes 206 are activated to produce the low power signal patterns. When the wireless nodes 206 are no longer able to communicate with the mobile device 124, the vehicle 200 determines that the driver has left the vicinity. At block 402, all of the wireless nodes 206 may be off.

The vehicle 200 proceeds from block 402 to block 404 at a predetermined frequency or internal (e.g., every 30 seconds). At block 404, vehicle 200 commands the center sector antennas to run in the high power mode and generate the high power signal patterns 202*a*. The high power signal patterns 202*a* include a command instructing a mobile device 124 to reply to the high power signal pattern. The reply includes a unique identifier (e.g., MAC address) of the specific mobile device 124. The command may be limited to one of the mobile devices stored in the above-discussed list. The high power signal patterns may include a node identifier associated with the specific node 206 generating the specific high power signal pattern. Alternatively or in addition, and as stated below, the identifier, instead of being sent from the mobile device 124, may be internally determined by vehicle 200 (i.e., vehicle 200 determines which nodes received the reply). The command may instruct the mobile device 124 to reply with the node identifier for reasons discussed below.

If no reply is received within a predetermined period of time (e.g., 1 second), then the vehicle 200 returns to block 402. If, however, a reply is received within the predetermined period of time, then the vehicle 200 compares the unique identifier (e.g., the MAC address) to the MAC addresses of the mobile devices 124 in the above-discussed list. If the received unique identifier fails to match any the stored identifiers, then the vehicle 200 returns to block 402. If the received unique identifier matches one of the stored identifiers, then the vehicle 200 proceeds to block 406.

At block 406, vehicle 200 may command all of the sector antennas 206 to generate the low power signal patterns 202*b*, 203, and 204. Alternatively, the vehicle 200 may command only some of the nodes 206 to generate the low power signal patterns 202*b*, 203, and 204. The other nodes 206 may be off. The vehicle 200 may select which of the nodes 206 generate the lower power signal patterns 202*b*, 203, and 204 based on the node identifier (this identifier, instead of being sent from the mobile device 124, may be internally determined by the vehicle 200). For example, the vehicle 200 may instruct the node 206 corresponding to the node identifier and nodes 206 adjacent to said node 206 to be on while all other nodes 206 are off.

The low power signal patterns 202*b*, 203, 204 include a command instructing a mobile device 124 to reply to the low power signal pattern. The reply includes a unique identifier (e.g., MAC address) of the specific mobile device 124. The command may be limited to one of the mobile devices stored in the above-discussed list. The lower power signal patterns 202*b*, 203, 204 may include a node identifier associated with the specific node 206 generating the specific low power signal pattern. The command may instruct the mobile device 124 to reply with the node identifier and with a sector antenna identifier (e.g., left, middle, right). Alternatively or in addition, and as stated below, the identifier, instead of being sent from the mobile device 124, may be internally determined by vehicle 200 (i.e., vehicle 200 determines which nodes and/or sector received the reply). If no reply is received within a predetermined period of time (e.g., 1 second) or a reply is received from an unknown mobile device 124, then vehicle 200 returns to block 404. If, however, a reply is received within the predetermined period of time, then the vehicle 200 proceeds to block 408 (according to some embodiments) or to block 412 (according to other embodiments).

Figure 5:
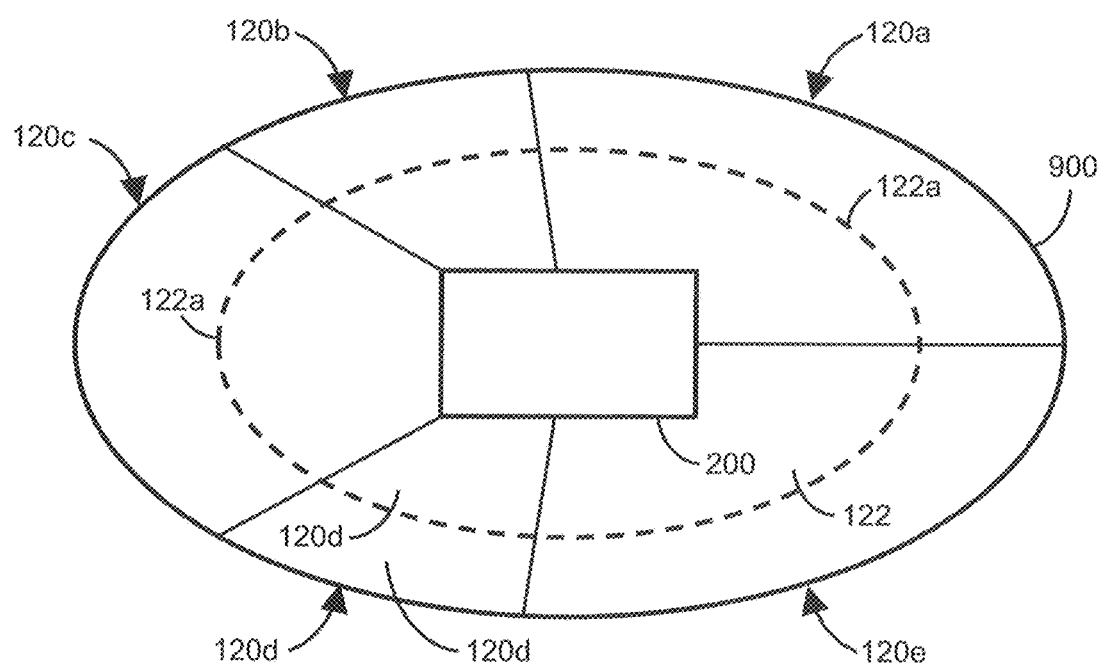
FIG. 5 is a schematic of zones generated by the vehicle.

At block 408, the vehicle 200 generates one or more zones based on the node identifier, the sector antenna identifier (these identifiers, instead of being sent from the mobile device 124, may be internally determined by the vehicle 200). FIG. 5 shows exemplary zones 120*a* to 120*d*. Each zone extends from the vehicle to an arced portion of a predetermined oval-shaped outer perimeter 900. The shape of the generated zones depends on the node identifier and/or the sector antenna identifier. At least one of the zones is marked as the probable zone based on the node identifier and/or the sector antenna identifier. The two zones next to the probable zones are marked as adjacent zones.

At block 408, the vehicle 200 activates the cameras and/or the ultrasonic sensors that are configured to scan the probable zone. The vehicle 200 applies the previously discussed image and/or ultrasonic processing software to resolve a person in the probable zone. According to some embodiments, the vehicle 200 first applies the ultrasonic sensors to detect objects within the probable zone. The vehicle 200 then applies the cameras to identify or categorize detected objects having human characteristics (e.g., having a height greater than a predetermined height and a width greater than a predetermined width). Put differently, the vehicle 200 applies the image processing software to portions of the probable zone having objects, with human characteristics, identified via the ultrasonic sensors.

The vehicle 200 resolves properties (e.g., face and/or height) of the one or more objects via the image processing software. If none of the properties match, within a certain limit, properties (e.g., face and/or height) of the person associated with the mobile device 124 (the properties are prestored in the above-discussed list), then the vehicle 200 may repeat the process for the two adjacent zones. If the repeat of the process still does not result in a matching face and/or height, then the vehicle 200 returns to block 406. According to some embodiments, the vehicle 200 does not repeat the process for the two adjacent zones such that the mobile device and the person must be in the probable zone.

If the face and/or height do match the prestored features, then the vehicle 200 proceeds to block 410. At block 410, the vehicle 200 determines, with the above-discussed processing, a trajectory of the person (location, velocity (including heading), and acceleration (including heading). At block 410, the vehicle 200 may compare the location of the person to a welcome mode threshold 122*a*. If the person is inside the threshold 122*a*, then the vehicle 200 activates welcome mode at block 412. If the person is outside of the threshold 122*a*, then the vehicle either returns to block 408 (according to some embodiments) or block 406 (according to other embodiments).

Additional Operations of the Initiation Application

Alternatively or in addition comparing the location of the person to the threshold 122*a*, the vehicle 200 may perform additional operations. If the results of these additional operations are invalid, then the vehicle 200 may determine that the outcome of block 410 is invalid. If at least one of the additional operations is valid, then the vehicle 200 may determine that the outcome of block 410 is valid.

One operation may determine whether the person is headed toward (a) toward the vehicle 200 or (b) headed to a driver door access area 802. If neither (a) nor (b) are true, then the vehicle 200 may determine that that the result of this operation is invalid and proceed to a new operation (if such other operations exist).

The discussion below references heading. Heading may be determined by averaging a predetermined number of recent positional measurements (from the ultrasonic sensors or the cameras) to yield an average velocity (which includes a heading). Heading may be determined with reference to properties of the driver. These properties may include a direction of the person's head or a direction perpendicular to the person's shoulders. These properties may be resolved via the above-discussed image processing software.

With reference to FIG. 7, an oval shaped area 801 includes a driver door access area 802 and a blocked area 803. The vehicle 200 includes a driver door 200a. The driver door access area is defined by two segments extending from opposing edges of the driver door 200a and intersecting a perimeter of the oval shaped area 801. According to some embodiments, the oval-shaped area 801 may represent outer perimeter 900 or welcome mode threshold 122a.

The lines 807, 808 may be parallel or non-parallel with a longitudinal axis L of the vehicle 200. The lines 807, 808 may be non-parallel such that a person can view driver door 200a from any point in access area 802. The lines 807, 808 may be any suitable shape such that a person can view driver door 200a (without looking through windows of the vehicle 200) from any point in access area 802. Alternatively or in addition, the lines 807, 808 may be any suitable shape such that a segment connecting the person with any point on the driver door 200a does not intersect the vehicle 200. It should thus be appreciated that blocked area 803 may include any portion of area 801 where a segment drawn between the person and the driver door 200a intersects a non-driver door feature of the vehicle 200.

When the person is in driver door access area 802, the vehicle 200 may only determine that the result of the present operation is valid when a speed of the person is above a predetermined speed and/or the heading of the person intersects the driver door 200a without intersecting any other portion of the vehicle 200. With reference to FIG. 7, person 804 has a velocity 804 (and thus a heading) intersecting driver door 200a.

When the person is in area 803, the vehicle 200 may enter welcome mode only when a speed of the person is above a predetermined speed and/or the heading of the person intersects a selected portion of segment 807 or segment 808. With reference to FIG. 7, the selected portion of segment 807 may extend from driver door 200a to point 807a. The selected portion of segment 808 may extend from driver door 200a to point 808a. Person 805 has a velocity 805a (and thus a heading) intersecting the selected portion of segment 808. Thus, according to one embodiment, the result of the present operation (as discussed above and below, the vehicle 200 may perform a plurality of different operations) is valid. Person 806 has a velocity 806a (and thus a heading) not intersecting the selected portions of segments 807 and 808. Thus, according to one embodiment, the result of the present operation is invalid.

Another operation may determine whether the person is headed toward the rear of the vehicle 200 to access a trunk 200b. This operation may be similar to the above-discuss driver door operation, except with areas 802 and 803 rearranged such that area 802 applies to the trunk 200b, and not to the driver door 200a. Other similar operations may determine whether the person is headed toward any of the vehicle doors (e.g., the front passenger door, the rear passenger door) and activate puddle lights corresponding to the door, but not other puddle lights and unlock the corresponding door, but not the other doors.

Additional Welcome Mode Operations

According to some embodiments, an outcome of the operation dictates how welcome mode is performed. For example, if a result of the driver door operation is valid, then the driver door may be unlocked and first puddle lights located near the driver door may be activated and second puddle lights located near the trunk may be off. If a result of the trunk operation is valid, then the trunk may be unlocked and second puddle lights located near the trunk may be activated while the first puddle lights remain off. The same applies to the other operations (e.g., the operation for the front passenger door). According to some embodiments, when the driver door operation is valid, all puddle lights are activated and when any other operation is valid (e.g., the front passenger door or the trunk), only corresponding puddle lights are activated.

At block 412, the vehicle 200 may determine whether the driver has physically interacted with the vehicle 200 (e.g., opened one of the doors, entered the vehicle, etc.). Once the driver has physically interacted with the vehicle 200, a full welcome mode may be activated (e.g., all puddle lights are turned on and/or all doors are unlocked). If the driver has not physically interacted with the vehicle 200 within a predetermined amount of time (e.g., ten seconds or a time based on the detected speed of the person), then the vehicle 200 may return to block 410.

When the vehicle 200 returns to block 410, the specific welcome mode (e.g., the welcome mode corresponding to the driver door) may be turned off (i.e., the door may be locked and the lights may be turned off), left partially on (e.g., the lights remain on but the driver door locks), or left fully on (e.g., the lights remain on and the driver door remains unlocked).

Figure 6:
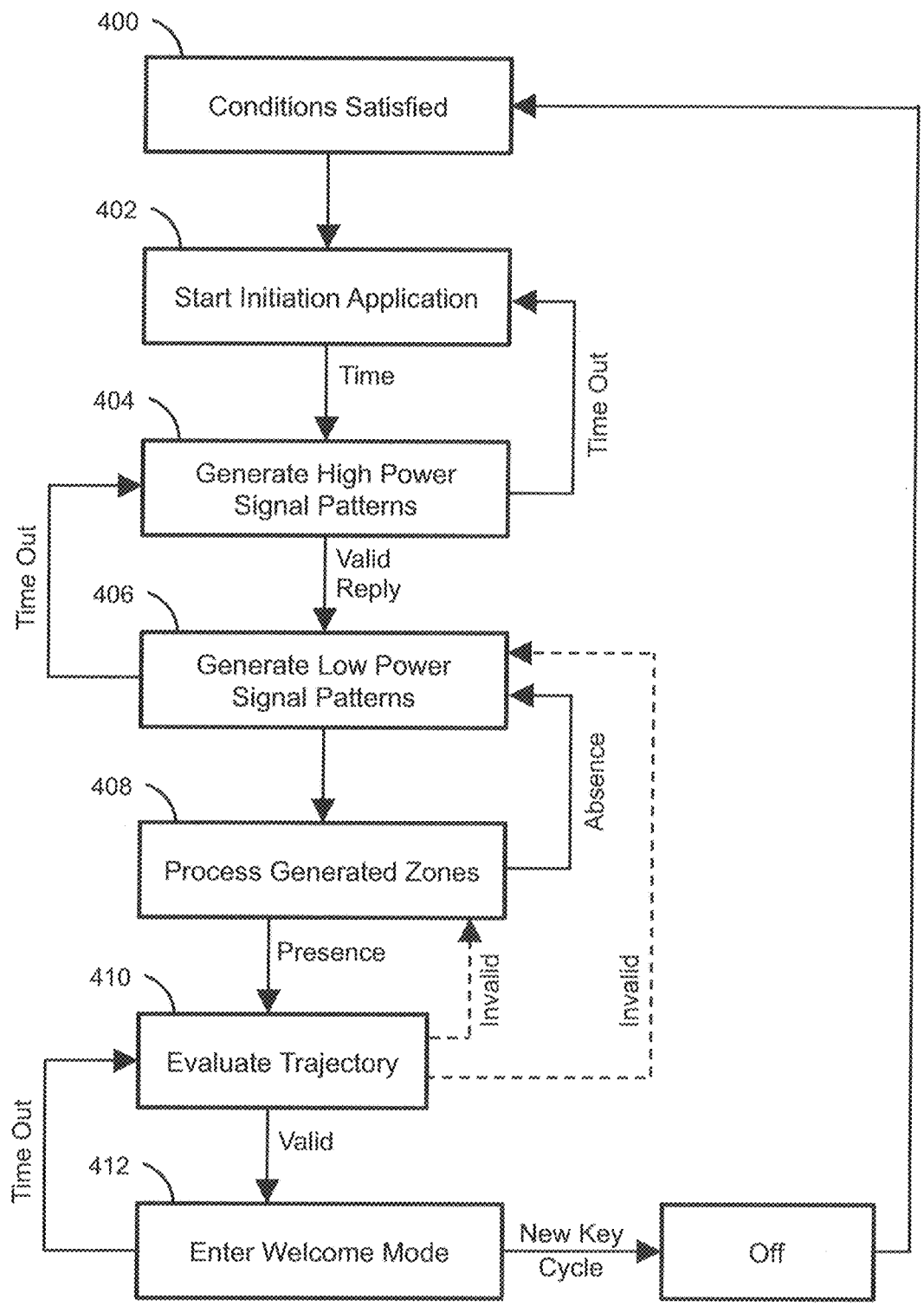
FIG. 6 is a block diagram of a series of operations corresponding to an initiation application for entering welcome mode.

When welcome mode is left on or partially on, the welcome mode may be turned off when the outcome of block 410 is invalid or the outcome of block 410 corresponds to a different welcome mode (e.g., a welcome mode corresponding to the passenger door). Alternatively, when the welcome mode is left on or partially on, the welcome mode may be turned off only when the outcome of block 410 corresponds to a different welcome mode or the vehicle 200 returns to block 406 (according to some embodiments), block 404 (according to other embodiments), or block 402 (according to other embodiments). According to some embodiments, a return to block 406 causes any door opened with the algorithm of FIG. 6 to lock (i.e., not doors opened according to other algorithms such as doors opened via the key fob). According to other embodiments, a return to block 406 causes any opened door to lock.

When a new key cycle begins, the welcome mode may be turned off at block 414 and the process may repeat.

Disclaimer

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
one or more nodes and one or more cameras positioned to monitor a surrounding area of the vehicle;
one or more puddle lights; and
a processor configured to:
command the one or more nodes to produce a first power signal pattern to link with a mobile device of a user;
identify which of the nodes linked with the mobile device via the first power signal patterns;
based on the identified nodes, command at least some of the nodes to produce second power signal patterns covering a smaller area than that of the first power signal patterns;
identify a zone of the surrounding area based upon which of the nodes linked with the mobile device via the second power signal patterns;

select a portion of the one or more cameras that are configured to monitor the identified zone;

detect, via the selected portion of the one or more cameras, a static feature of the user, wherein the detected static feature is related to at least one of a group consisting of a face and a height of the user; and responsive to identifying that the detected static feature is one of a plurality of prestored features corresponding with the user, activate a portion of the one or more puddle lights based on the identified zone.

2. The vehicle of claim 1, wherein production of the first power signal patterns requires more energy than production of the second power signal patterns.

3. The vehicle of claim 1, wherein each of the nodes includes a plurality of antennas including one or more first antennas and one or more second antennas, and wherein the processor is configured to command the first antennas of each of the nodes, but not the second antennas of each of the nodes, to produce the first power signal patterns.

4. The vehicle of claim 3, wherein the processor is further configured to command the first antennas and the second antennas of at least one of the nodes to produce the second power signal patterns.

5. The vehicle of claim 1, wherein the processor is further configured to unselected nodes to not produce the second power signal patterns.

6. The vehicle of claim 1, wherein the processor is further configured to run image processing software on the images captured by the selected portion of the one or more cameras.

7. The vehicle of claim 6, wherein the processor is further configured to not run the image processing software on the images captured by an unselected portion of the one or more cameras.

8. The vehicle of claim 1, further including sensors, wherein the processor is further configured to determine a position of the user via the sensors.

9. The vehicle of claim 8, wherein the processor is further configured to determine the position of the user by running image processing software on at least some of images captured by the selected portion of the one or more cameras.

10. The vehicle of claim 6, wherein the processor is further configured to only run the image processing software on images captured the selected portion of the one or more cameras for monitoring the user.

11. The vehicle of claim 9, wherein the processor is further configured to compare the position of the user to a predetermined perimeter and activate the portion of the one or more puddle lights upon identifying that the position is inside the identified zone.

12. The vehicle of claim 1, further including sensors, wherein the processor is further configured to determine a trajectory of the user via the sensors.

13. The vehicle of claim 12, wherein the processor is further configured to activate the portion of the one or more puddle lights based on the determined trajectory.

14. The vehicle of claim 1, wherein, the processor is further configured to:

responsive to determining that the position of the user is within a threshold distance of the vehicle, the processor is configured to activate the portion of the one or more puddle lights, the threshold distance being shorter than the maximum range of the first power signal patterns.

15. The vehicle of claim 1, further comprising a door comprising a handle, wherein the processor is further configured to cause the door to unlock responsive to identifying the detected static feature is one of the plurality of prestored features and detecting actuation of the handle.

16. The vehicle of claim 1, further comprising a door and sensors, wherein the processor is further configured to cause the door to unlock responsive to identifying the detected static feature is one of the plurality of prestored features and determining, via at least one of a group consisting of the one or more cameras and the sensors, that the user is approaching the vehicle.

17. A method of controlling a vehicle, the vehicle comprising one or more nodes, one or more cameras, one or more puddle lights, and a processor, the method comprising, via the processor:

commanding the one or more nodes to produce first power signal patterns to link with a mobile device of a user;

identifying which of the nodes linked with the mobile device via the first power signal patterns;

based on the identified nodes, commanding at least some of the nodes to produce second power signal patterns covering a smaller area than that of the first power signal patterns;

identifying a zone of a surrounding area of the vehicle based upon which of the nodes linked with the mobile device via the second power signal patterns;

selecting a portion of the one or more cameras that are configured to monitor the identified zone;

detecting, via the selected portion of the one or more cameras, a static feature of the user, wherein the detected static feature is related to at least one of a group consisting of a face and a height of the user; and responsive to identifying that the detected static feature is one of a plurality of prestored features corresponding with the user, activating a portion of the one or more puddle lights based on the identified zone.

18. The method of claim 17, wherein each of the nodes includes a plurality of antennas including one or more first antennas and one or more second antennas and further comprising commanding the first antennas of each of the nodes, but not the second antennas of each of the nodes, to produce the first power signal patterns.

19. The method of claim 18, further comprising commanding the first antennas and the second antennas of at least one of the nodes to produce the second power signal patterns.

* * * * *